United States Patent
Nakayama

(10) Patent No.: US 9,723,170 B2
(45) Date of Patent: Aug. 1, 2017

(54) IMAGE FORMING APPARATUS FOR SHARPENING IMAGE AND IMAGE FORMING SYSTEM WITH THE SAME

(71) Applicant: KYOCERA Document Solutions Inc., Osaka (JP)

(72) Inventor: Toru Nakayama, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/337,564

(22) Filed: Oct. 28, 2016

(65) Prior Publication Data

US 2017/0134607 A1     May 11, 2017

(30) Foreign Application Priority Data

Nov. 10, 2015   (JP) ................. 2015-220065

(51) Int. Cl.
*H04N 1/32*     (2006.01)
*H04N 1/40*     (2006.01)

(52) U.S. Cl.
CPC . *H04N 1/32149* (2013.01); *H04N 2201/0094* (2013.01); *H04N 2201/3271* (2013.01)

(58) Field of Classification Search
CPC ....... H04N 1/32149; H04N 2201/0094; H04N 2201/3271
See application file for complete search history.

(56) References Cited

U.S. PATENT DOCUMENTS

| | | | |
|---|---|---|---|
| 8,873,091 B2 * | 10/2014 | Ogawa | H04N 1/00204 358/1.15 |
| 9,134,940 B2 | 9/2015 | Ogawa et al. | |
| 2006/0274366 A1* | 12/2006 | Nakayama | G06F 3/1212 358/1.15 |
| 2012/0075671 A1 | 3/2012 | Ogawa et al. | |
| 2015/0009538 A1 | 1/2015 | Ogawa et al. | |
| 2015/0350487 A1 | 12/2015 | Ogawa et al. | |

FOREIGN PATENT DOCUMENTS

JP     2012-070343 A     4/2012

* cited by examiner

*Primary Examiner* — Quang N Vo
(74) *Attorney, Agent, or Firm* — IP Business Solutions, LLC

(57) ABSTRACT

An image forming apparatus includes an image acquisition section, an image processing section, and an image forming section. The image processing section extracts an identifier given to an irreversibly compressed set of image data in print data, allows the image acquisition section to acquire a corresponding set of image data associated with the extracted identifier, and replaces an image represented by the irreversibly compressed set of image data with an image represented by the corresponding set of image data to generate a print target image. The image forming section forms the generated print target image on a recording paper sheet. The irreversibly compressed set of image data and the corresponding set of image data associated with the identifier given to the irreversibly compressed set of image data represent the same object image.

10 Claims, 8 Drawing Sheets

| KCjpg | | | | | | | | | | | | | | | | | |
|---|---|---|---|---|---|---|---|---|---|---|---|---|---|---|---|---|---|
| ADDRESS | 00 | 01 | 02 | 03 | 04 | 05 | 06 | 07 | 08 | 09 | 0A | 0B | 0C | 0D | 0E | 0F | 0123456789ABCDEF |
| 00000000 | FF | D8 | FF | ED | 00 | 12 | 4B | 44 | 43 | 6F | 6D | 70 | 61 | 6E | 79 | 4C | ....KKKCompanyL |
| 00000010 | 6F | 67 | 6F | 30 | 31 | FF | E0 | 00 | 10 | 4A | 46 | 49 | 46 | 00 | 01 | 01 | ogo001...JFIF.. |
| 00000020 | 01 | 01 | 00 | 96 | 00 | 96 | 00 | 00 | FF | DB | 00 | 43 | 00 | 0A | 07 | 07 | ...........□.C.. |
| 00000030 | 09 | 07 | 06 | 0A | 09 | 08 | 09 | 0B | 0A | 0C | 0F | 19 | 10 | 0F | 0E | 0E | ................ |
| 00000040 | 0E | 0F | 1E | 17 | 12 | 2A | 36 | 2B | 2B | 23 | 20 | 23 | 3B | 30 | 22 | 28 | ....$ &%# #"( |
| 00000050 | 2D | 39 | 30 | 28 | 2A | 46 | 45 | 3E | 4B | 4A | 39 | 32 | 36 | 44 | 22 | 40 | -90(*6+"#2D26;=@ |
| 00000060 | 40 | 40 | 26 | 30 | 46 | 4B | 45 | 3E | 4A | 39 | 3F | 40 | 3D | 1D | 22 | 28 | @@&0FKE>J9?@=."( |
| 00000070 | 43 | 01 | 0B | 0B | 0B | 0F | 0D | 0F | 1D | 10 | 10 | 1D | 3D | 30 | 30 | 3D | C..........=)#) |
| 00000080 | 3D | 3D | 3D | 3D | 3D | 3D | 3D | 3D | 3D | 3D | 3D | 3D | 3D | 3D | 3D | 3D | ================ |
| 00000090 | 3D | 3D | 3D | 3D | 3D | 3D | 3D | 3D | 3D | 3D | 3D | 3D | 3D | 3D | 3D | 3D | ================ |
| 000000A0 | 3D | 3D | 3D | 3D | 3D | 3D | 3D | 3D | 3D | 3D | 3D | 3D | 3D | 3D | 3D | 3D | ================ |
| 000000B0 | 3D | 3D | 3D | 3D | 3D | 3D | 3D | 3D | 00 | 11 | FF | 08 | 00 | FC | 02 | EA | ==.%........... |
| 000000C0 | 3D | 3D | FF | C0 | 00 | 11 | 00 | 00 | 00 | 00 | 1F | 00 | 00 | 00 | 00 | 00 | ==.......h...ォ.. |
| 000000D0 | 11 | 01 | 03 | 01 | 00 | 00 | 00 | 00 | 0A | 0B | 04 | 00 | B5 | 10 | 00 | 00 | ................ |
| 000000E0 | 01 | 01 | 00 | 01 | 03 | 05 | 04 | 03 | 05 | 05 | 00 | 0A | FF | C4 | 00 | 00 | ................ |
| 000000F0 | 06 | 07 | 08 | 09 | 0A | 0B | 11 | FF | 04 | 04 | 06 | 13 | 51 | 61 | 7D | 07 | ........!1A..Qa. |
| 00000100 | 02 | 04 | 03 | 11 | 05 | 12 | 21 | 31 | 41 | 06 | C1 | 52 | D1 | 07 | 22 | 71 | .......!1A..Qa."q |
| 00000110 | 11 | 05 | A1 | 08 | 23 | 42 | B1 | C1 | 15 | 52 | D1 | F0 | 24 | 33 | 62 | 72 | ....#B7#.R1.$3br |
| 00000120 | 09 | 0A | 16 | 17 | 18 | 19 | 1A | 25 | 26 | 27 | 28 | 29 | 2A | 34 | 35 | 36 | .......%&'()*456 |

T

IMAGE FORMING APPARATUS FOR SHARPENING IMAGE AND IMAGE FORMING SYSTEM WITH THE SAME

INCORPORATION BY REFERENCE

This application claims priority to Japanese Patent Application No. 2015-220065 filed on Nov. 10, 2015, the entire contents of which are incorporated by reference herein.

BACKGROUND

The present disclosure relates to image forming apparatuses and image forming systems for forming print target images on recording paper sheets and particularly relates to a technique for printing an image represented by irreversibly compressed image data.

Image forming apparatuses are known which receive print data via a network from a terminal apparatus, such as a PC, interpret the print data to generate a print target image including a text, an image, and so on, and record the print target image on a recording paper sheet. As an example of such image forming apparatuses, an image forming apparatus is proposed which receives from a terminal apparatus print data representing a stamp image composed of, for example, letters, figures, and symbols, stores the stamp image in a memory of the image forming apparatus, and prints the stamp image superimposed on an arbitrary print target image.

SUMMARY

A technique improved over the above technique is proposed herein as one aspect of the present disclosure.

An image forming apparatus according to an aspect of the present disclosure includes an image acquisition section, an image processing section, and an image forming section.

The image acquisition section acquires an uncompressed set of image data associated with an identifier specific to a set of image data.

The image processing section interprets print data to extract an identifier given to an irreversibly compressed set of image data contained in the print data, allows the image acquisition section to acquire a corresponding set of image data associated with the extracted identifier and having an image quality equivalent to that of a set of image data before being irreversibly compressed into the irreversibly compressed set of image data, and replaces an image represented by the irreversibly compressed set of image data with an image represented by the corresponding set of image data to generate a print target image.

The image forming section forms on a recording paper sheet the print target image generated by the image processing section.

The irreversibly compressed set of image data and the corresponding set of image data associated with the identifier given to the irreversibly compressed set of image data represent the same object image.

An image forming system according to another aspect of the present disclosure includes a terminal apparatus and an image forming apparatus connected to the terminal apparatus.

The terminal apparatus includes a printer driver and a transmitting section.

The printer driver generates print data containing an irreversibly compressed set of image data.

The transmitting section sends the print data to the image forming apparatus.

The image forming apparatus includes a receiving section that receives the print data, an image acquisition section that acquires an uncompressed set of image data associated with an identifier, the above-described image processing section, and the above-described image forming section.

The irreversibly compressed set of image data and the corresponding set of image data associated with the identifier given to the irreversibly compressed set of image data represent the same object image.

BRIEF DESCRIPTION OF THE DRAWINGS

FIG. 5 exemplarily shows tag information given to a set of image data compressed in the JPEG format.

DETAILED DESCRIPTION

Hereinafter, a description will be given of an image forming apparatus according to an embodiment of the present disclosure with reference to the drawings.

Figure 1:
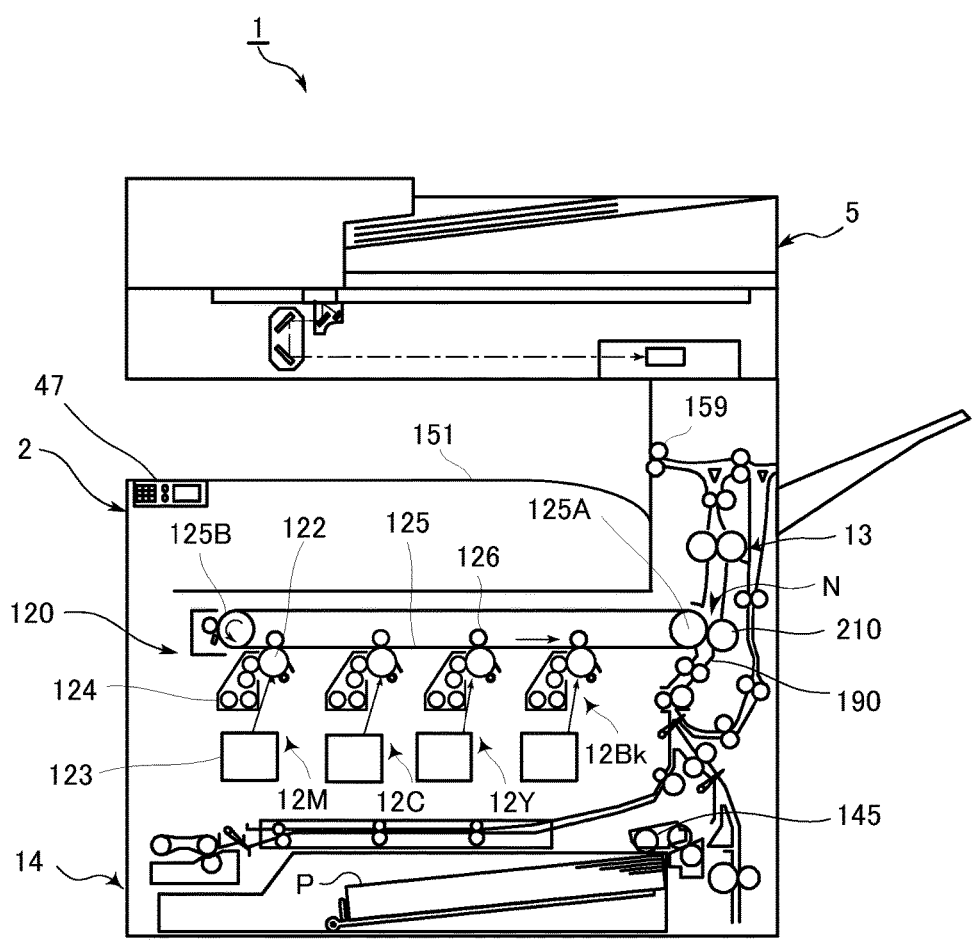
FIG. 1 is a front cross-sectional view showing the structure of an image forming apparatus according to one embodiment of the present disclosure.

FIG. 1 is a front cross-sectional view showing the structure of an image forming apparatus according to one embodiment of the present disclosure. The image forming apparatus 1 according to this embodiment is a multifunction peripheral having multiple functions including, for example, a copy function, a print function, a scan function, and a facsimile function. This image forming apparatus 1 is made up so that an apparatus body 2 is provided with an image scanner unit (ISU) 5, an operating section 47, an image forming section 120, a fixing device 13, a sheet feed section 14, and so on.

The operating section 47 is operated by a user to accept instructions to perform an image forming operation, an image scanning operation, and other operations.

In performing the image scanning operation, the image scanner unit 5 optically scans an image of an original document and generates image data from the scanned image. The image data generated by the image scanner unit 5 is stored on an internal HDD, a network-connected computer or the like.

In performing the image forming operation, the image forming section 120 forms a toner image on a recording paper sheet P serving as a recording medium fed from the sheet feed section 14, based on image data generated by the above image scanning operation, image data received from the network-connected computer or a user's terminal device, such as a smartphone, image data stored on the internal HDD, or other image data.

The image forming section 120 includes an image forming unit 12M for magenta, an image forming unit 12C for cyan, an image forming unit 12Y for yellow, and an image forming unit 12Bk for black. Each of the image forming units 12M, 12C, 12Y, and 12Bk includes a photosensitive drum 122, a charging device operable to uniformly charge the surface of the photosensitive drum 122, a laser scanning unit (LSU) 123 operable to expose the surface of the photosensitive drum 122 to laser light to form an electrostatic latent image on the surface thereof, a developing device 124 operable to develop the electrostatic latent image on the surface of the photosensitive drum 122 into a toner image using toner, and a primary transfer roller 126.

In performing color printing, the image forming units 12M, 12C, 12Y, and 12Bk uniformly charge the surfaces of their respective photosensitive drums 122, then expose them to laser light to form respective electrostatic latent images corresponding to images of their color components on the surfaces, develop the electrostatic latent images on the surfaces of the photosensitive drums 122 with the developing device 124 to form respective toner images of their color components on the photosensitive drums 122, and then allow their respective primary transfer rollers 126 to primarily transfer the toner images to an intermediate transfer belt 125 mounted around a drive roller 125A and a driven roller 125B.

The intermediate transfer belt 125 has an outside surface serving as an image carrying surface on which toner images are to be transferred and is driven in engagement against the peripheral surfaces of the photosensitive drums 122 by the drive roller 125A. The intermediate transfer belt 125 travels in an endless path between the drive roller 125A and the driven roller 125B while synchronizing with each photosensitive drum 122.

The toner images of different color components transferred to the intermediate transfer belt 125 are superimposed each other on the intermediate transfer belt 125 by controlling their transfer timings, resulting in a multicolor toner image. A secondary transfer roller 210 secondarily transfers the multicolor toner image formed on the surface of the intermediate transfer belt 125, at a nip N between the secondary transfer roller 210 and the intermediate transfer belt 125, to a recording paper sheet P conveyed from the sheet feed section 14 along a conveyance path 190.

Thereafter, the fixing device 13 applies heat and pressure to the recording paper sheet P, thus fixing the toner image on the recording paper sheet P by heat and pressure. Then, the recording paper sheet P is discharged through an output roller pair 159 to a sheet output tray 151.

The sheet feed section 14 contains a plurality of recording paper sheets P and allows a pick-up roller 145 to be rotationally driven and thus convey a recording paper sheet P to the conveyance path 190.

Figure 2:
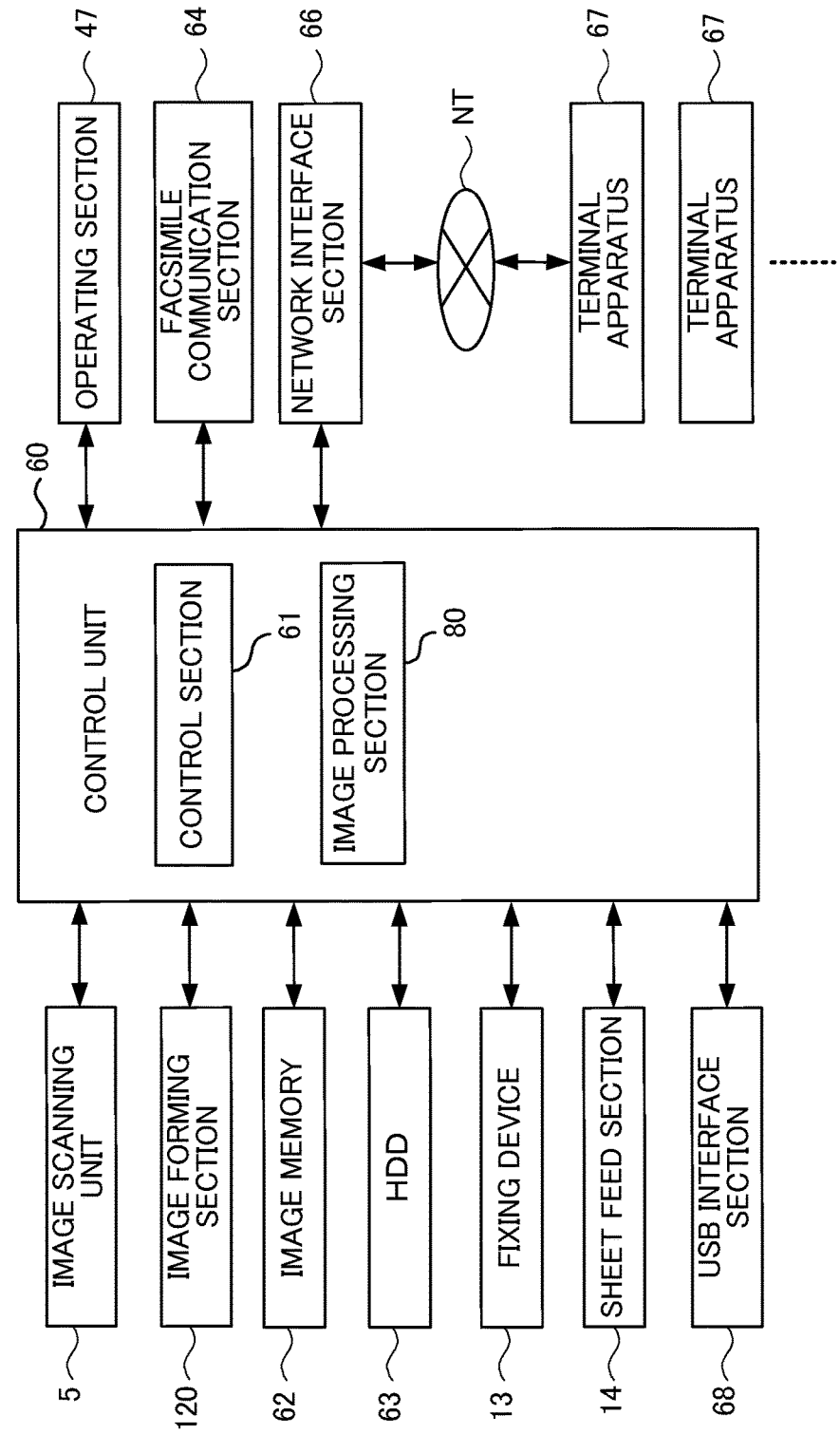
FIG. 2 is a functional block diagram showing an essential configuration of the image forming apparatus.

Next, a description will be given of the configuration of the image forming apparatus 1. FIG. 2 is a functional block diagram showing an essential configuration of the image forming apparatus 1.

The image forming apparatus 1 is made up by including a control unit 60, the image scanning unit 5, the image forming section 120, the fixing device 13, the sheet feed section 14, the operating section 47, an image memory 62, an HDD 63, a facsimile communication section 64, a network interface section 66, a USB interface section 68, and so on. The same components as those described with reference to FIG. 1 are designated by the same reference numerals.

The control unit 60 is composed of a CPU (central processing unit), a RAM, a ROM, a dedicated hardware circuit, and so on. The control unit 60 includes a control section 61 and an image processing section 80.

The control section 61 is connected to the control unit 60, the image scanning unit 5, the fixing device 13, the image forming section 120, the sheet feed section 14, the operating section 47, the image memory 62, the HDD 63, the facsimile communication section 64, the network interface section 66, and so on and totally control the image forming apparatus 1.

The image processing section 80 uses print data received from a terminal apparatus 67 (see FIG. 4) to perform various types of image processing necessary for the image forming section 120 to form an image on a recording paper sheet P.

The facsimile communication section 64 includes a coding/decoding section, a modulation/demodulation section, and an NCU (network control unit), all of which are not illustrated, and performs facsimile communication using a public telephone network.

The network interface section 66 is constituted by a communication module, such as a LAN board, and transfers various data via a network NT, such as a LAN, connected to the network interface section 66 to and from a plurality of terminal apparatuses 67, such as personal computers (PCs), on the network NT. Furthermore, the USB interface section 68 also transfers various data via a USB cable to and from the terminal apparatuses 67, such as PCs. Although hereinafter a description will be given of, as an example, the case where the image forming apparatus 1 transfers data through the network interface section 66 to and from the terminal apparatuses 67, the image forming apparatus 1 can also transfer data through the USB network interface 68 to and from the terminal apparatuses 67 to perform the same types of processing as those described below.

The image memory 62 is a region for temporarily storing data of an image of an original document scanned by the image scanning unit 5 and for temporarily saving data to be printed by the image forming section 120.

The HDD 63 is a large storage device for storing the image of the original document scanned by the image scanning unit 5 or like images.

In this configuration, the user can operate the operating section 47 to instruct a job using any one of the facsimile communication function, the copy function, and the print function. For example, when the job using the copy function is instructed by the operation of the operating section 47, the control section 61 allows the image scanning unit 5 to scan an image of an original document and allows the image forming section 120 to print the image of the original document on a recording paper sheet P.

Furthermore, in the image forming apparatus 1, print data sent from the terminal apparatus 67 is received via the network NT by the network interface section 66 and stored in the image memory 62 or the like. The image processing section 80 interprets this print data to generate a print target image including a text, an image, and so on. The image forming section 120 prints the print target image on the recording paper sheet P.

As used herein, print data transferred from the terminal apparatus 67 to the image forming apparatus 1 represents, for example, a text and/or an image. For example, as for the text, respective character codes representing characters contained in the text are transferred. As for the image, a set of image data representing the image is transferred in a form compressed at a high compression efficiency.

An example of the format for compressing a set of image data at a high compression efficiency is the JPEG (Joint Photographic Experts Group) format in which a set of image data is irreversibly compressed. In this embodiment, the above set of image data contained in the print data is generated in the JPEG format which is an irreversibly compressed format. However, this is not intended to limit the irreversibly compressed format shown in the present disclosure to the JPEG format. In the case of the JPEG format, even if expansion processing is applied to a set of image data compressed in this format, an original set of image data cannot fully be restored and image degradation occurs. As long as the image degradation occurs on a photograph or the like, it is less visible and, therefore, presents no substantial problem.

Figure 3A:
FIG. 3A shows an image of a company logo corresponding to an uncompressed set of image data.
Figure 3B:
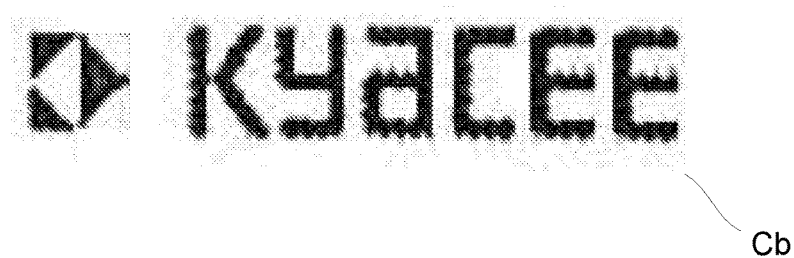
FIG. 3B shows an image of the company logo corresponding to a set of image data obtained by compression/expansion processing in the JPEG format.

However, images of logos, banners, symbols, and the like are often created as graphic images, in which case image degradation due to the sets of image data generated in the JPEG format is likely to be visible to the user. For example, if compression and expansion processing in the JPEG format is applied to an uncompressed set of image data representing an image Ca of a company logo as shown in FIG. 3A, the set of image data obtained by the compression and expansion processing represents an image Cb of the company logo as shown in FIG. 3B. As is clearly seen from comparison between FIGS. 3A and 3B, in the image Cb of the company logo obtained by the compression and expansion processing as shown in FIG. 3B, the object image has a blurred outline, mosquito noise occurs at the boundaries between different colors, and/or block noise occurs.

In view of this, this embodiment is directed toward enabling an image created as a graphic image, such as a logo, a banner or a symbol, to be sharply formed on a recording paper sheet even after having been transferred from the terminal apparatus 67 to the image forming apparatus 1.

Next, a description will be given of, by taking as an example a company logo created from a graphic image, the configuration and procedure of processing for sharply forming an image of the company logo on a recording paper sheet by the image forming apparatus 1 when the image of the company logo has been sent from the terminal apparatus 67 to the image forming apparatus 1.

Figure 4:
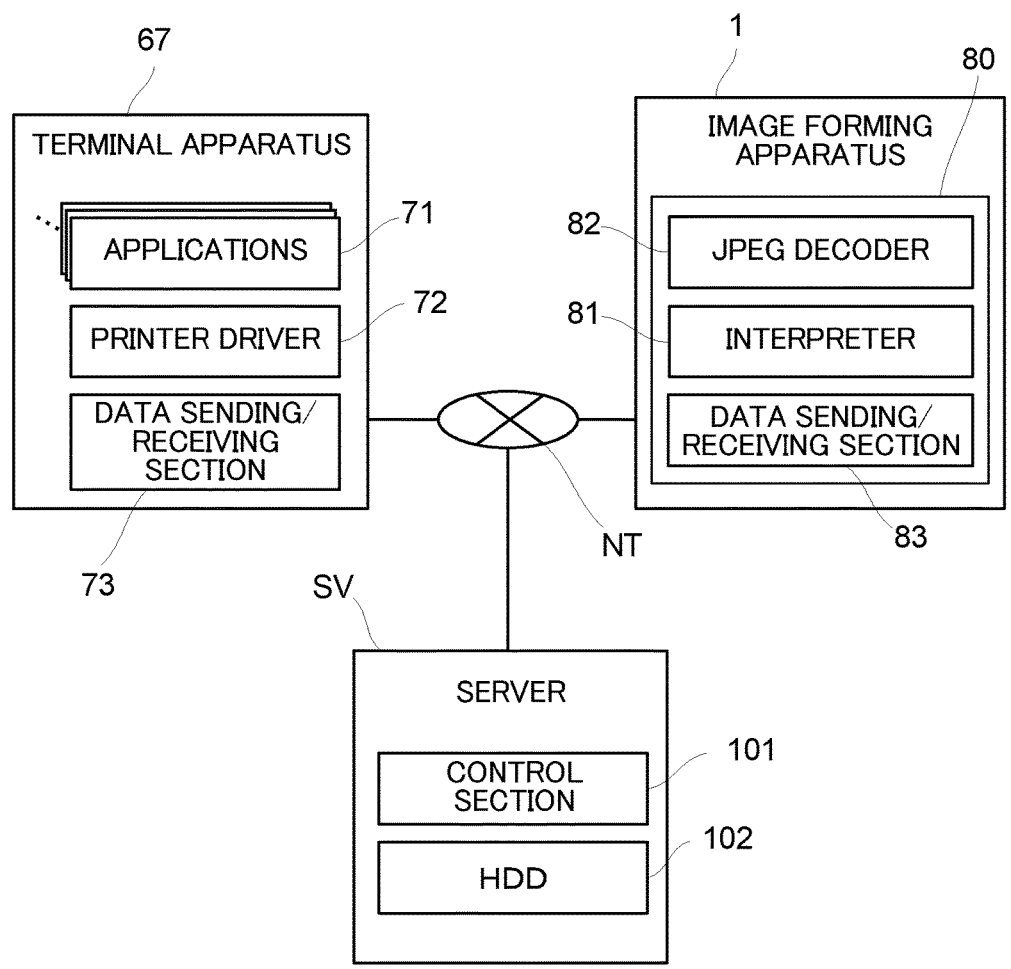
FIG. 4 is a functional block diagram showing an image forming system formed by connecting the image forming apparatus and a terminal apparatus via a network.

FIG. 4 is a functional block diagram showing an image forming system formed by connecting the image forming apparatus 1 and the terminal apparatus 67 via the network NT and shows software and hardware configurations of the image forming apparatus 1 and the terminal apparatus 67.

The terminal apparatus 67 has a well-known hardware configuration composed of a CPU, an HDD, a communication module, a display device, a keyboard, a pointing device, and so on. Furthermore, as shown in FIG. 4, the terminal apparatus 67 includes various types of application programs 71 capable of running on an operating system, a printer driver 72, a data sending/receiving section 73, and so on.

Examples of the various types of application programs 71 include a document preparation program, such as a word processor, and a program for creating and editing texts, images, and so on. The application program 71 creates print data using a set of text data representing a text, a set of image data representing an image, or a set of position data defining the positions of a text, an image, and so on. The printer driver 72 generates, from the print data created by the application program 71, print data formed of a predetermined printer language. The data sending/receiving section 73 sends, in accordance with a predetermined communication protocol, the print data generated by the printer driver 72 to the image forming apparatus 1 via the network NT.

As shown in FIG. 4, the image processing section 80 of the image forming apparatus 1 includes an interpreter 81, a JPEG decoder 82, a data sending/receiving section 83, and so on. The interpreter 81 and the JPEG decoder 82 may be formed of software or formed of hardware.

The data sending/receiving section (an example of the image acquisition section) 83 receives print data through the network interface section 66 via the network NT from the terminal apparatus 67 in accordance with the above-mentioned predetermined communication protocol and stores the print data into a storage area, such as the image memory 62. Furthermore, the data sending/receiving section 83 also communicates with the server SV and acquires a corresponding set of image data (to be described hereinafter) from the server SV.

The JPEG decoder 82 applies expansion processing to a set of image data contained in print data and compressed in the JPEG format. Furthermore, the JPEG decoder 82 in this embodiment performs other types of processing to be described hereinafter.

The interpreter 81 interprets print data and decompresses the print data into a bitmap according to the result of the interpretation to generate a print target image. Specifically, the interpreter 81 decompresses the print data into a bitmap by arranging one or more texts represented by respective sets of text data contained in the print data and one or more images represented by respective sets of image data contained in the print data at their respective positions defined by a set of position data contained in the print data, thus generating a print target image. The image forming section 120 forms the print target image on a recording paper sheet P. The recording paper sheet P having the image formed thereon is discharged to the sheet output tray 151.

Under the above configuration, in the terminal apparatus 67, images of company logos formed of graphic images, for example, are previously stored on the HDD or the like. The terminal apparatus 67 stores the images of the company logos on the HDD or the like, for example, by downloading them via the network NT from Web sites of the companies. Then, in creating print data using the application program 71, an image of any company logo is read from the HDD or the like by the operation of the keyboard, the pointing device or the like and then incorporated into the print data.

In this relation, these images of the company logos are previously subjected to compression processing in the JPEG format. FIG. 3B shows an example of such an image Cb of a company logo.

Furthermore, as is well known, each set of image data subjected to compression processing in the JPEG format is given tag information T. The tag information T contains the size of the relevant image, the number of colors of the relevant image, and other information on the relevant image and further contains arbitrary information. In this embodiment, an identifier ID for use in identifying the image of the company logo is set as the arbitrary information. The setting of the identifier ID is carried out, for example, by the company that publishes on its own Web site the image of the company logo as a set of image data subjected to compression processing in the JPEG format. The company sets the identifier ID, for example, using a tag editor.

FIG. 5 shows an example of tag information T. In the tag information T shown in FIG. 5, the header of the identifier ID is indicated by "FF D8" on the second line and the identifier ID is indicated by "FF ED 00 ...... 30 30 31" on the second to third lines.

The application program 71 in the terminal apparatus 67 creates print data using a set of image data subjected to compression processing in the JPEG format and having such tag information T. The set of image data is incorporated into the print data and sent from the terminal apparatus 67 to the image forming apparatus 1.

Whereas as just described there is such a compressed set of image data in which tag information T contains an identifier ID, the application program 71 can also handle compressed sets of image data in which tag information T contains no identifier ID (for example, images other than images of company logos managed by their companies).

On the other hand, the server SV connected via the network NT to the image forming apparatus 1 previously stores, on its storage area, for example, an HDD 102, a plurality of corresponding sets of image data (for example, uncompressed sets of image data, such as bit-mapped data). An image represented by such a corresponding set of image data is, for example, the image Ca of the company logo as shown in FIG. 3A. The description in this embodiment is given by taking as an example the case where the corresponding set of image data is an uncompressed set of image data.

Figure 6:
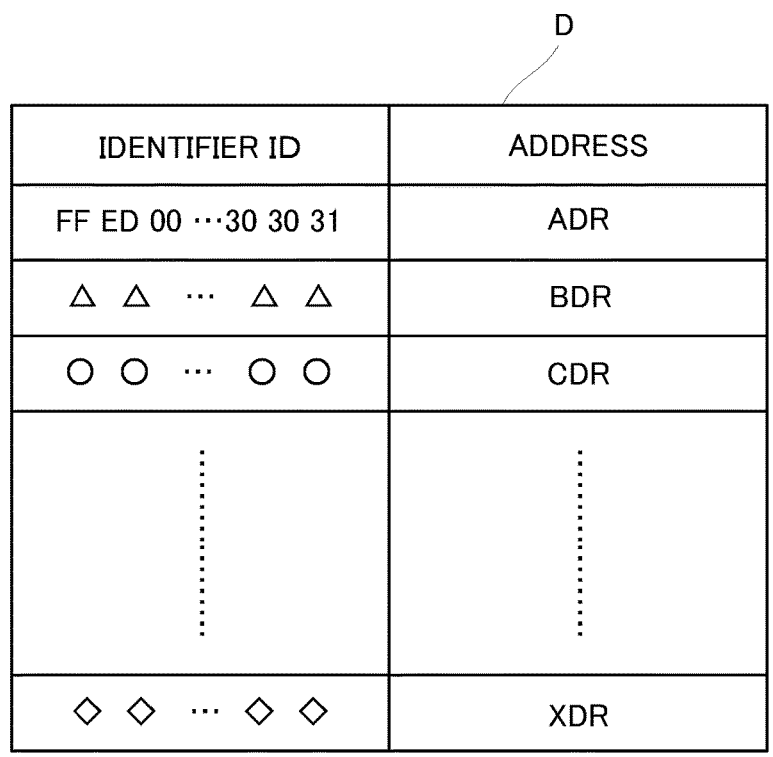
FIG. 6 conceptually shows a data table in which respective identifiers for sets of tag information are associated with individual addresses of uncompressed sets of image data.

The server SV previously stores a data table D as shown in FIG. 6 on the HDD 102. This data table D is formed so that, for each of a plurality of types of company logos, an identifier ID is associated with the address of a corresponding set of image data representing the image of the company logo.

In this relation, an object image (a company logo in the above example) corresponding to a set of image data which has been subjected to compression processing in the JPEG format and has tag information T with an identifier ID set therefor is the same as an object image (a company logo in the above example) corresponding to a corresponding set of image data read from the HDD 63 based on the address associated with the identifier ID in the data table D. For example, the identifier ID "FF ED ...... 30 31" shown in FIG. 6 is an identifier ID for tag information T given to a set of image data representing the image Cb of the company logo shown in FIG. 3B. In the data table D, the above identifier ID is associated with an address (address indicating a data readout area in the HDD 102) ADR. A corresponding set of image data read from the HDD 102 based on the address ADR is, for example, the image Ca of the company logo shown in FIG. 3A, wherein the company logo is the same as shown in FIG. 3B. In other words, corresponding sets of image data A' including the same respective object images as sets of image data A generated by irreversible compression are stored, on the HDD 102 of the server SV, so that they are given individual identifiers ID identical to identifiers ID given to the sets of image data A. The plurality of sets of image data A are given respective specific identifiers ID and sets of image data given respective identifiers ID identical to the above specific identifiers ID are stored on the HDD 102.

In the image forming apparatus 1, when the JPEG decoder 82 extracts an identifier ID from tag information T of a set of image data subjected to compression processing in the JPEG format, the data sending/receiving section 83 accesses the server SV through the network interface section 66 and requests the server SV to send a corresponding set of image data having an identifier ID identical to the extracted identifier ID. In the server SV having received this request, its control section 101 refers to the data table D, finds out the address given to the corresponding set of image data having the above identifier ID, and reads, based on the address, the corresponding set of image data from the HDD 102. The control section 101 sends the read corresponding set of image data to the image forming apparatus 1 having sent the above request. The data sending/receiving section 83 of the image forming apparatus 1 receives the corresponding set of image data. Thus, the image forming apparatus 1 can use, for print data, in place of an image of, for example, a company logo, represented by a set of image data obtained by expansion processing in the JPEG format, a sharp image of the same company logo represented by a corresponding set of image data.

Furthermore, in the image forming apparatus 1, when no identifier ID is extracted from tag information T of a set of image data subjected to compression processing in the JPEG format, expansion processing in the JPEG format is applied to this set of image data to obtain an image represented by the set of image data obtained by the expansion processing.

Figure 7:
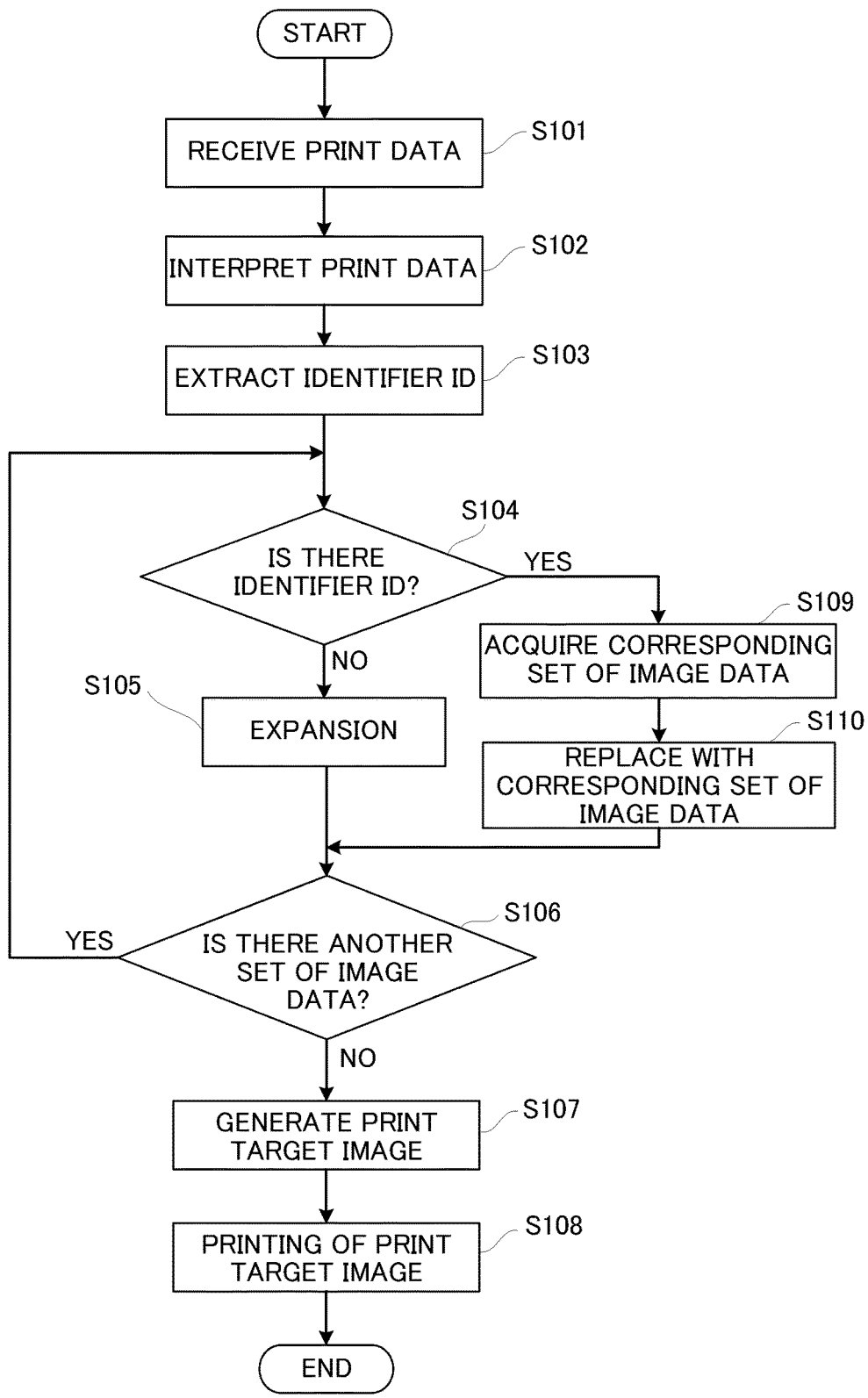
FIG. 7 is a flowchart showing a processing procedure in the image forming apparatus.

Next, a description will be given of the processing procedure in the image forming apparatus 1 with reference to the flowchart shown in FIG. 7.

In the image forming apparatus 1, when print data sent from the terminal apparatus 67 is received (S101), the print data is stored in the image memory 62 or the like and interpreted by the interpreter 81 (S102). According to the result of this interpretation, the JPEG decoder 82 refers to tag information T of a set of image data contained in the print data and compressed in the JPEG format and attempts to extract an identifier ID from the tag information T (S103).

If in S103 an identifier ID is extracted (YES in S104), the data sending/receiving section 83 request the server SV to send a corresponding set of image data having an identifier ID identical to the extracted identifier ID and acquires the corresponding set of image data from the server SV (S109).

Subsequently, the JPEG decoder 82 replaces the set of image data contained in the print data received in S101 and compressed in the JPEG format with the corresponding set of image data acquired in S109 (S110). Thus, in the print data, for example, a compressed set of image data representing the image Cb of the company logo shown in FIG. 3B is replaced with a corresponding set of image data representing the image Ca of the company logo shown in FIG. 3A.

On the other hand, if in S103 no identifier ID is extracted (NO in S104), the JPEG decoder 82 applies expansion processing in the JPEG format to the set of image data compressed in the JPEG format (S105). Specifically, the JPEG decoder 82 does not perform the above processing for replacement with a corresponding set of image data, but generates a print target image using a set of image data itself obtained by expanding the set of image data compressed in the JPEG format.

Furthermore, if any further set of image data is contained in the print data (YES in S106), the JPEG decoder 82 repeats the sequence of processing steps from S103.

If the print data contains no further set of image data (NO in S106), the interpreter 81 decompresses the print data into a bitmap by arranging a single or plurality of texts represented by respective sets of text data, a single or plurality of images represented by respective corresponding sets of image data obtained in S109, and/or, if S105 has been executed, a single or plurality of images represented by respective expanded sets of image data obtained in S105 at their respective positions defined by a set of position data, thus generating a print target image (S107). The image forming section 102 forms an image on a recording paper sheet P using the print target image (S108).

Figure 8:
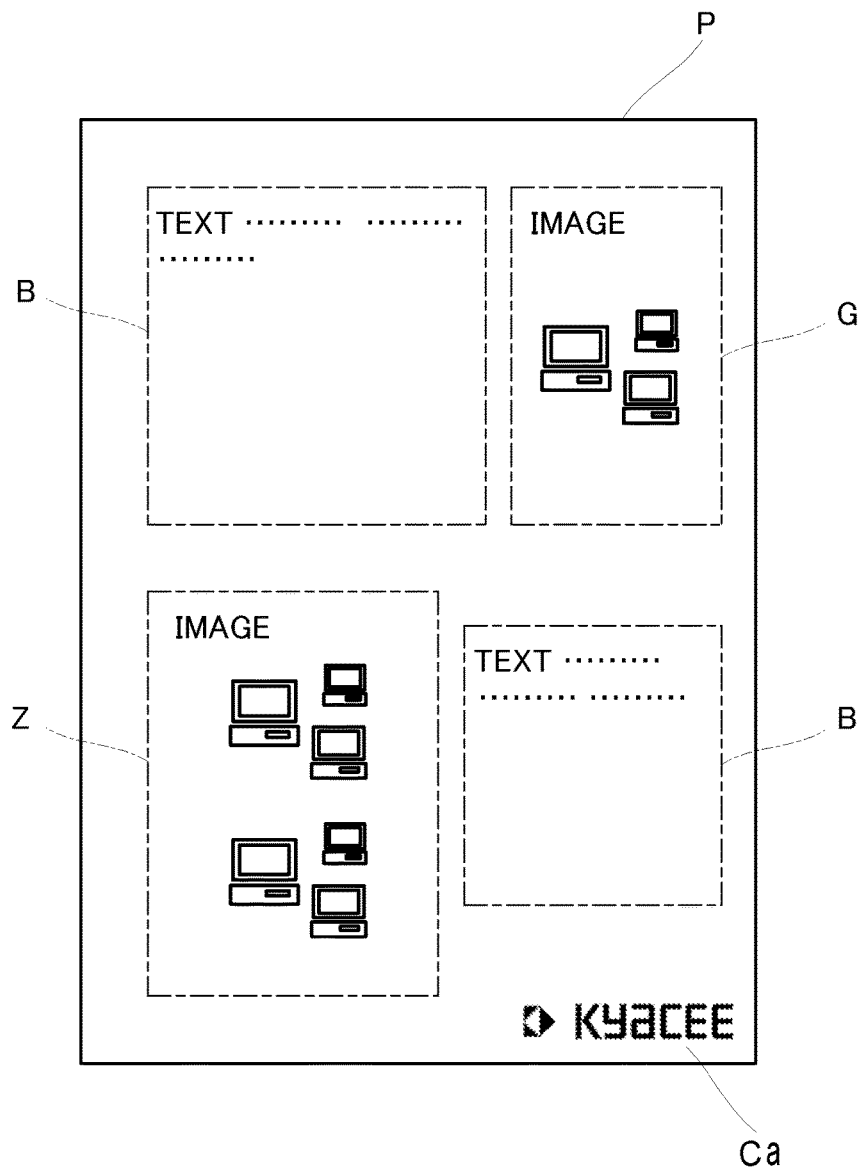
FIG. 8 is a view illustrating a print target image.

FIG. 8 is a view illustrating a print target image formed on a recording paper sheet P. In this print target image, texts B, the image Ca of the company logo represented by an uncompressed set of image data, and images G and Z obtained by expansion processing in the JPEG format are formed at their respective positions. Among the images, the image Ca of the company logo is formed, even if the set of image data contained in its original print data is a set of image data obtained by compressing a graphic image by JPEG not from an image obtained by expansion processing in the JPEG format but from an image represented by a corresponding set of image data replaced in the above manner.

As thus far described, in this embodiment, when print data is sent from the terminal apparatus 67 to the image forming apparatus 1, the image processing section 80 of the image forming apparatus 1 interprets the print data to generate a print target image, extracts an identifier ID from tag information T given to a JPEG-compressed set of image data serving as a irreversibly compressed set of image data contained in the print data, acquires from the server SV a corresponding set of image data (an uncompressed set of image data in this embodiment) associated with the extracted identifier ID, and pastes into the print target image an image represented by the corresponding set of image data, for example, the image Ca of the company logo. Then, the image forming section 120 forms this print target image on a recording paper sheet P. Therefore, according to the image forming apparatus 1, even in forming an image based on an irreversibly compressed set of image data, for example, a set of image data compressed by JPEG a sharp image (the image Ca of the company logo in the example shown in this embodiment) can be formed on a recording paper sheet P.

Generally, a set of image data contained in print data is often compressed in an irreversible compression format having a high compression efficiency and, for example, the JPEG format is applied as the irreversible compression format. Also in the image forming apparatus described in BACKGROUND, print data containing a set of image data compressed in the JPEG format is received from the terminal apparatus and a stamp image is also received in a form compressed in the JPEG format.

In the case of an irreversible compression format, such as the JPEG format, even if expansion processing is applied to a set of image data compressed in this format, an original set of image data cannot be restored and image degradation occurs. As long as such image degradation occurs on a photograph or the like, it is less visible and, therefore, presents no substantial problem.

However, in the case of images, such as logos, banners, and symbols, which are created from graphic images and in which emphasis is on sharpness, blurred outlines, mosquito noise or block noise occurring in the images may cause the corporate image to be tarnished (lower society's impression). Therefore, it is desired to avoid image degradation. Hence, in sending an image in which emphasis is on sharpness from the terminal apparatus to the image forming apparatus and printing the image in the image forming apparatus, it is preferred to sharply form the image on a recording paper sheet.

In this respect, according to the above embodiment, even when an image generated in an irreversible compression format has been sent as a print target from the terminal apparatus to the image forming apparatus, the image can be sharply formed in the image forming apparatus.

Although in the above embodiment an image of a company logo is taken as an example, the same effect can be achieved on other types of images, such as logos, banners, and symbols, formed of graphic images by applying the embodiment described in the present disclosure to them. A significant effect can be achieved by applying the embodiment described in the present disclosure to image data obtained by irreversibly compressing graphic images, but the embodiment described in the present disclosure is not limited to image data obtained by irreversibly compressing graphic images and is widely applicable to any irreversibly compressed image data.

Although in the above embodiment the JPEG format is taken as an example of compression and expansion processing for image data, the same effect can be achieved, even for other irreversible compression formats, by applying the embodiment described in the present disclosure. For example, the embodiment described in the present disclosure is also applicable to the TIFF format, the EPS format, and the JPEG 2000 format which are other irreversible compression formats.

In the above embodiment, the control section 61 of the image forming apparatus 1 acquires from the server SV an uncompressed set of image data for use in replacement of an irreversibly compressed set of image data. Alternatively, the HDD 63 of the image forming apparatus 1 may store the above-described data table as well as uncompressed sets of image data which have identifiers ID identical to identifiers ID given to irreversibly compressed sets of image data and represent the same object images as represented by the irreversibly compressed sets of image data, and the control section 61 may read, upon extraction of an identifier ID from tag information T of an irreversibly compressed set of image data, an uncompressed set of image data having an identifier ID identical to the extracted identifier ID from the HDD 63.

Furthermore, the HDD 63 of the image forming apparatus 1 may store, instead of uncompressed sets of image data, reversibly compressed sets of image data. In this case, the data sending/receiving section 83 makes the above request to the server SV and acquires a corresponding reversibly compressed set of image data from the server SV and a decoder for reversibly compressed sets of image data included in the image processing section 80 expands the reversibly compressed set of image data. The decoder replaces an image represented by a reversibly compressed set of image data with an image represented by the expanded set of image data. With the use of a reversibly compressed set of image data in this manner, it is possible to obtain a set of image data having the same quality as the original set of image data by expansion processing while reducing the amount of data transmitted between the server SV and the image forming apparatus 1.

Although the description of the above embodiment is given taking a color multifunction peripheral as the image forming apparatus according to one embodiment of the present disclosure, the embodiment is merely illustrative and the image forming apparatus may be any other image forming apparatus, including a black-and-white multifunction peripheral and other types of image forming apparatuses, such as a printer, a copier, and a facsimile machine.

The structure, configuration, and processing of the above embodiment described with reference to FIGS. 1 to 8 are merely illustrative of the present disclosure and the present disclosure is not intended to be limited to the above structure, configuration, and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image forming apparatus comprising:
an image acquisition section that acquires an uncompressed set of image data associated with an identifier specific to a set of image data;
an image processing section that interprets print data to extract an identifier given to an irreversibly compressed set of image data contained in the print data, allows the image acquisition section to acquire a corresponding set of image data associated with the extracted identifier and having an image quality equivalent to that of a set of image data before being irreversibly compressed into the irreversibly compressed set of image data, and replaces an image represented by the irreversibly compressed set of image data with an image represented by the corresponding set of image data to generate a print target image; and
an image forming section that forms on a recording paper sheet the print target image generated by the image processing section,
wherein the irreversibly compressed set of image data and the corresponding set of image data associated with the identifier given to the irreversibly compressed set of image data represent the same object image.

2. The image forming apparatus according to claim 1, wherein the corresponding set of image data is an uncompressed set of image data representing the same object image as the irreversibly compressed set of image data.

3. The image forming apparatus according to claim 1, wherein
the corresponding set of image data is a reversibly compressed set of image data representing the same object image as the irreversibly compressed set of image data, and
the image processing section generates the print target image using, as the image represented by the corresponding set of image data, an image represented by a set of image data obtained by expanding the reversibly compressed set of image data.

4. The image forming apparatus according to claim 1, wherein
the identifier is contained in tag information given to the irreversibly compressed set of image data, and
the image processing section extracts the identifier by referring to the tag information given to the irreversibly compressed set of image data.

5. The image forming apparatus according to claim 1, further comprising a storage section that stores the corresponding set of image data associated with the specific identifier,
wherein the image processing section serves as the image acquisition section to read the corresponding set of image data associated with the identifier from the storage section and replaces, in the print target image, the image represented by the irreversibly compressed set of image data with the image represented by the corresponding set of image data.

6. The image forming apparatus according to claim 1, wherein the corresponding set of image data is a graphic image.

7. The image forming apparatus according to claim 1, wherein the image processing section comprises a decoder that, when no identifier to be given to the irreversibly compressed set of image data is extracted, applies expansion processing to the irreversibly compressed set of image data and outputs a set of image data obtained by the expansion processing, and the image processing section replaces, in the print target image, the image represented by the irreversibly compressed set of image data with an image represented by the set of image data obtained by the expansion processing.

8. The image forming apparatus according to claim 1, wherein the irreversible compression is performed in JPEG format.

9. The image forming apparatus according to claim 1, the identifier is contained in tag information given to the set of image data compressed in the JPEG format.

10. An image forming system comprising a terminal apparatus and an image forming apparatus connected to the terminal apparatus,
the terminal apparatus comprising:
a printer driver that generates print data containing an irreversibly compressed set of image data; and
a transmitting section that sends the print data to the image forming apparatus,
the image forming apparatus comprising:
a receiving section that receives the print data;
an image acquisition section that acquires an uncompressed set of image data associated with an identifier;
an image processing section that interprets print data to extract an identifier given to an irreversibly compressed set of image data contained in the print data, allows the image acquisition section to acquire a corresponding set of image data associated with the extracted identifier and having an image quality equivalent to that of a set of image data before being irreversibly compressed into the irreversibly compressed set of image data, and replaces an image represented by the irreversibly compressed set of image data with an image represented by the corresponding set of image data to generate a print target image; and
an image forming section that forms on a recording paper sheet the print target image generated by the image processing section,
wherein the irreversibly compressed set of image data and the corresponding set of image data associated with the identifier given to the irreversibly compressed set of image data represent the same object image.

* * * * *